US008874301B1

(12) United States Patent
Rao et al.

(10) Patent No.: US 8,874,301 B1
(45) Date of Patent: Oct. 28, 2014

(54) AUTONOMOUS VEHICLE WITH DRIVER PRESENCE AND PHYSIOLOGICAL MONITORING

(71) Applicant: Ford Global Technologies, LLC, Dearborn, MI (US)

(72) Inventors: Manoharprasad K. Rao, Novi, MI (US); Mark A. Cuddihy, New Boston, MI (US); Jialiang Le, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 13/937,446

(22) Filed: Jul. 9, 2013

(51) Int. Cl.
*G01C 22/00* (2006.01)
*G05D 1/00* (2006.01)
*B60K 28/06* (2006.01)
*B60W 40/08* (2012.01)

(52) U.S. Cl.
CPC .............. *G05D 1/0055* (2013.01); *B60K 28/06* (2013.01); *B60W 2040/0872* (2013.01); *B60W 2040/0881* (2013.01)
USPC ............... 701/25; 701/23; 180/272; 180/273; 340/439; 340/576

(58) Field of Classification Search
CPC ............. B60W 2040/0881; B60W 2040/0872; B60W 40/09; B60W 50/14; B60K 28/06
USPC ........ 701/1, 23, 25, 45, 46, 47; 340/439, 576; 180/232, 268, 271, 272, 273
See application file for complete search history.

(56) References Cited

U.S. PATENT DOCUMENTS

| | | | |
|---|---|---|---|
| 5,969,616 A | 10/1999 | Tschoi | |
| 6,392,550 B1 | 5/2002 | Najor | |
| 6,661,345 B1 | 12/2003 | Bevan et al. | |
| 6,734,799 B2 | 5/2004 | Munch | |
| 6,756,903 B2 | 6/2004 | Omry et al. | |
| 6,946,966 B2 | 9/2005 | Koenig | |
| 7,710,279 B1 | 5/2010 | Fields | |
| 8,016,720 B2 | 9/2011 | Sokoll | |
| 2004/0262063 A1* | 12/2004 | Kaufmann et al. | 180/169 |
| 2008/0252466 A1* | 10/2008 | Yopp et al. | 340/576 |
| 2010/0222976 A1 | 9/2010 | Haug | |
| 2011/0241862 A1* | 10/2011 | Debouk et al. | 340/439 |
| 2013/0066525 A1 | 3/2013 | Tomik et al. | |

* cited by examiner

FOREIGN PATENT DOCUMENTS

JP 2009025984 5/2009

*Primary Examiner* — Gertrude Arthur Jeanglaude
(74) *Attorney, Agent, or Firm* — Frank A. MacKenzie; MacMillan, Sobanski & Todd, LLC

(57) ABSTRACT

A transportation vehicle with an autonomous driving control has a set-up mode, an active drive mode, a safe shutdown mode, and an emergency response mode. The active drive mode autonomously navigates along a driving route specified in the set-up mode. A driver sensing system senses a driver presence in the driver seat and a driver's physiological state. Active drive mode is not entered from set-up mode unless the driver is present in the driver seat and the physiological state matches a normal condition. While in active driving mode, an elapsed time period is measured whenever the driver presence is not detected. If the time period increases above a first threshold then a notice is given to the driver that the active drive mode may be interrupted. If the time period increases above a second threshold then the active drive mode is terminated and the safe shutdown mode is initiated. A sensed physiological state is compared to a predetermined emergency condition and if a match is found then the autonomous driving control terminates the active drive mode and the emergency response mode is initiated.

20 Claims, 3 Drawing Sheets

AUTONOMOUS VEHICLE WITH DRIVER PRESENCE AND PHYSIOLOGICAL MONITORING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to autonomously driven road vehicles, and, more specifically, to safety measures for autonomous vehicles to ensure that a physically capable driver is present in the driver seat during times that the vehicle operates autonomously.

The use of automation in the driving of road vehicles such as cars and truck has increased as a result of advances in sensing technologies (e.g., object detection and location tracking), control algorithms, and data infrastructures. By combining various enabling technologies like adaptive cruise control (ACC), lane keeping assistance (LKA), electronic power assist steering (EPAS), adaptive front steering, parking assistance, antilock braking (ABS), traction control, electronic stability control (ESC), blind spot detection, GPS and map databases, vehicle to vehicle communication, and other, it becomes possible to operate a vehicle autonomously (i.e., with little or no intervention by a driver).

Autonomous vehicles offer advantages in safer travel, enhanced mobility, and better coordination between vehicles. However, they also create need for extra monitoring to ensure that a driver is available at any time that manual intervention may be needed. As shown for example in patent application publication US 2010/0222976A1, a seat occupancy sensor is used to monitor the presence of the driver in the driver seat, and the driver assistance system is deactivated in the absence of the driver. However, ensuring that the driver does not leave the driver seat during the trip has only addressed one aspect of the issue. The vehicle should ensure that an able driver is present upon vehicle departure to prevent the autonomous vehicle from beginning any trip without a driver in the driver seat.

Besides the actual presence of a driver in the driver seat, it would be beneficial to also ensure that the person is capable of performing manual driving maneuvers as necessary. If a driver experiences a medical emergency, such as a stroke, heart attack, or loss of consciousness, then the vehicle could proceed unhindered to the destination. Besides losing the failsafe backup capability of a driver, this could waste precious time needed for emergency medical procedures.

It would be desirable to integrate driver presence and health monitoring into an autonomous vehicle control in a manner that is robust, easy to use, reliable, and efficient.

SUMMARY OF THE INVENTION

In one aspect of the invention, a road transportation vehicle having a driver seat comprises an autonomous driving control with a set-up mode, an active drive mode, a safe shutdown mode, and an emergency response mode. The set-up mode is used to specify a driving route. The active drive mode is used for performing autonomous steering, acceleration, and braking functions to navigate along the driving route. The safe shutdown mode is used for identifying and autonomously proceeding to an out-of-traffic stopping location. The emergency response mode autonomously performs an emergency intervention. A driver sensing system is provided for sensing a driver presence in the driver seat and for sensing a physiological state of the driver.

While in the set-up mode, the autonomous driving control compares the sensed physiological state to a predetermined normal condition. The active drive mode is not entered unless the driver is present in the driver seat and the physiological state matches the predetermined normal condition. While in the active driving mode, the autonomous driving control quantifies an elapsed time period over which the driver presence is not detected. If the time period increases above a first threshold then the autonomous driving control initiates a warning state to provide a notice to the driver that the active drive mode will be interrupted if the driver presence continues to not be detected. If the time period increases above a second threshold then the autonomous driving control terminates the active drive mode and initiates the safe shutdown mode. While in the active driving mode, the autonomous driving control compares the sensed physiological state to a predetermined emergency condition and if a match is found then the autonomous driving control terminates the active drive mode and initiates the emergency response mode.

Thus, a sensor or multiple sensors are used to monitor the operator presence in the driver seat and also to monitor driver physiological state in an autonomous vehicle. Known Occupant Classification Sensors as used for detecting front seat passengers in passive restraint systems can be used for detecting driver presence in the driver seat. Other presence detection sensors can also be used such as an infrared proximity detector. When the autonomous vehicle is in a non-parked state, a warning is issued whenever the driver is not detected. If the driver non-presence situation still persists, the vehicle is then safely steered to a safe location such as road side and is stopped.

For the driver physiological state, various health and wellness conditions (e.g., heart rate, respiration, skin temperature, blood sugar content, blood pressure, etc.) are monitored with any known biometric sensors. They can be built-in sensors (such as capacitive sensors integrated into the driver seat which can detect heart rate (ECG) and respiration, or electrodes on the steering wheel to detect heart rate in combination with a respiration sensor in the seat belt) or they can be driver-supplied devices monitoring unique conditions that are adapted to interface with the vehicle. In an alternate embodiment, interior vision sensors may be used to monitor the driver presence in the seat and driver physiological condition by monitoring driver facial biometrics, eye opening conditions, pulse rate and respiration with techniques such as facial feature analysis and pulse oxigraphy. In another alternate embodiment, the driver presence, heart rate, and respiration can also be monitoring with electro-magnetic remote sensing technologies such as radar and lidar sensors. The physiological state is monitored continuously while traveling. Upon detection of any serious condition/deviation in the biological signals, appropriate corrective measures can be undertaken, such as rerouting the autonomous vehicle to the nearest emergency medical center to provide the fastest treatment possible. Alternately, the vehicle may be safely steered to a location such as the road side, and an automatic emergency notification with vehicle location and driver status may be sent to an emergency response provider.

DETAILED DESCRIPTION OF PREFERRED EMBODIMENTS

Figure 1:
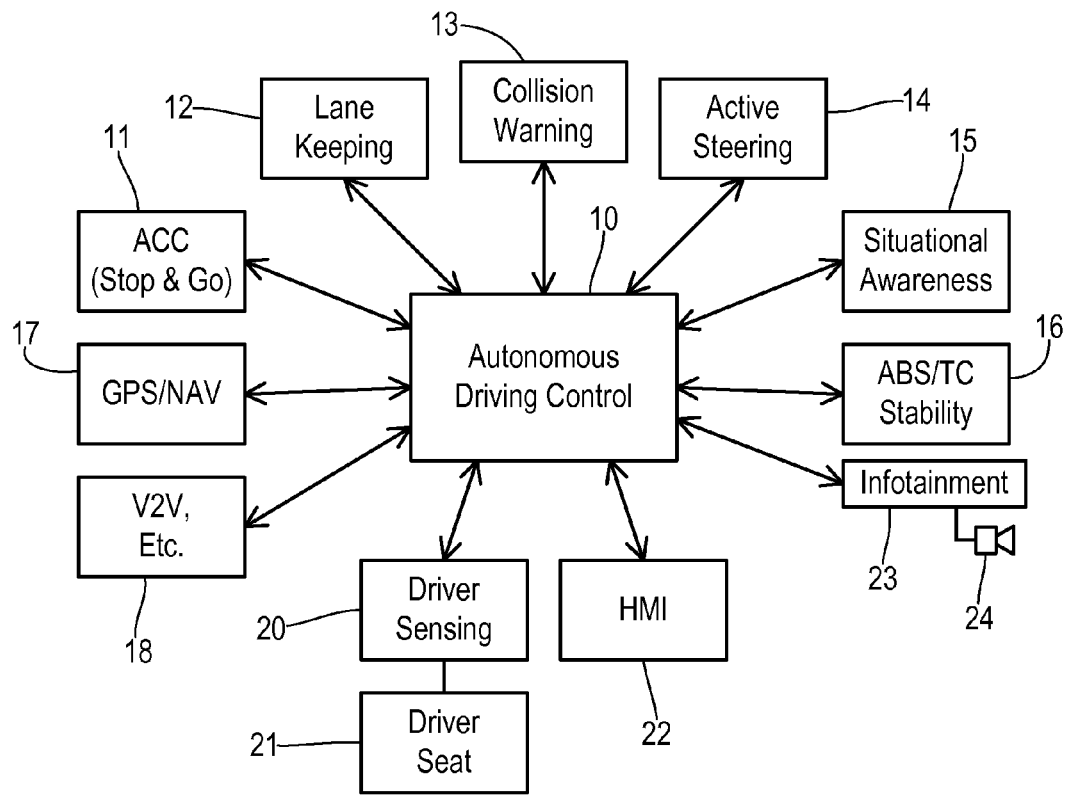
FIG. 1 is a block diagram showing relevant portions of a vehicle having the autonomous control of the present invention.

Referring to FIG. 1, an autonomous driving control 10 is coupled to and coordinates operation of a plurality of subsystems to obtain autonomous vehicle functioning. An adaptive cruise control (ACC) module 11 preferably provides a "stop and go" function capable of controlling vehicle forward movement in response to both a leading vehicle and traffic control devices such as stop signs and traffic lights. ACC module 11 is coupled to an engine or powertrain control unit (not shown) for accelerating and decelerating the vehicle. A lane keeping module 12 may preferably include the functionality of a lane departure warning system and/or a lane-keeping assistance system. A collision warning system 13 may preferably include forward, side, and rearward looking radar sensors and/or cameras providing data to an object identification and tracking system as known in the art. Collision warning system 13 may work together with other remote sensing components in a situational awareness block 15 to identify fixed or moving obstacles or other hazards.

An active steering subsystem 14 responds to commands from autonomous driving control 10 for changing a vehicle heading (e.g., to make turns or to follow a desired lane). Slowing or stopping of the vehicle is provided by a braking system 16 which may include ABS and/or stability control subsystems.

A GPS and navigation unit 17 is coupled to autonomous driving control 10 for providing vehicle position, speed, and heading information. A map database is stored within GPS unit 17 or is remotely accessed by GPS unit 17 (e.g., over a wireless data connection) for route planning and monitoring. Other remote information can be accessed wirelessly using a vehicle-to-vehicle (V2V) system 18, for example.

To provide the driver monitoring of the present invention, a driver sensing block 20 is coupled to autonomous driving control 10. Driver sensing block 20 includes one or more sensors directed to a driver seat 21 for detecting the presence or absence of the driver in a proper seated position in driver seat 21 and the physiological state of the driver.

A human-machine interface (HMI) 22 coupled to autonomous driving control 10 having push buttons, dials, voice activated systems, or other inputs to obtain driver input (e.g., when specifying a trip destination and/or route) and having a graphic display to provide driver feedback. Driver feedback may also be provided using an infotainment subsystem 23 (such as a Ford SYNC® system) to generate audible warning messages over a loudspeaker 24.

Figure 2:
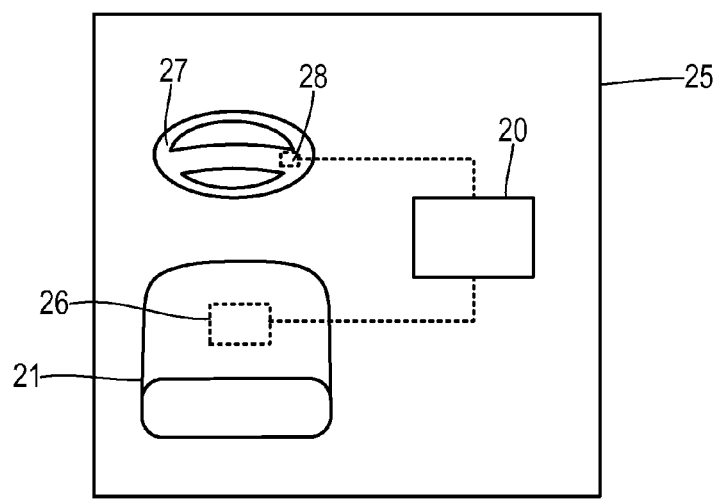
FIG. 2 is a diagram showing a driver seat and sensors.

FIG. 2 shows a vehicle 25 containing driver seat 21. A driver sensor 26 embedded in seat 21 is connected to the driver sensing function 20 which may be integrated into autonomous driving control 10. Sensor 26 may be comprised of a capacitive sensor for simultaneously sensing the driver's presence together with some physiological conditions such as heart rate (via ECG) and respiration rate. Alternatively, the driver may be monitored using a sensor 28 mounted on a steering wheel 27 or elsewhere in vehicle 25. Sensor 28 may include electrodes to detect heart rate, for example.

Figure 3:
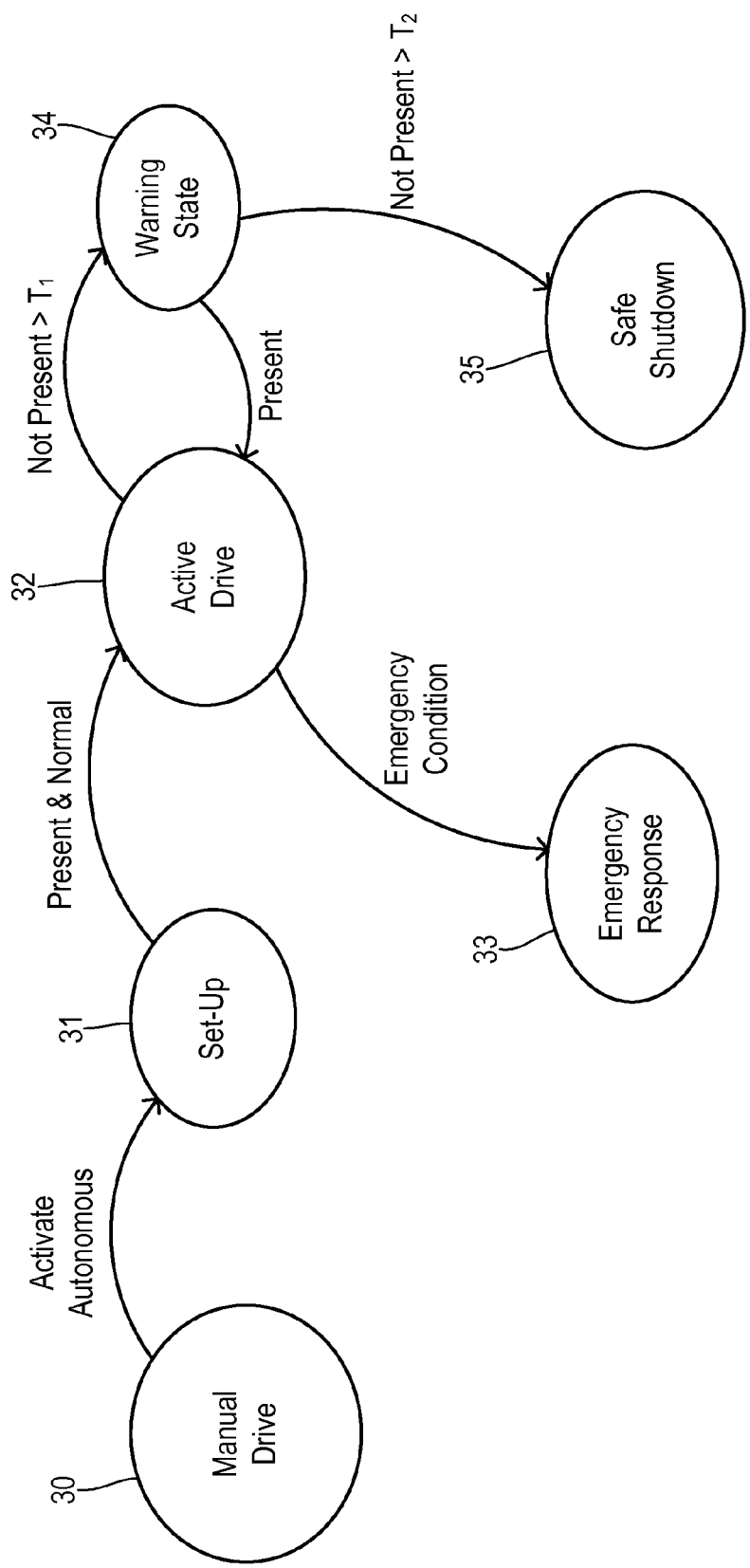
FIG. 3 is a state diagram showing the operation of one preferred embodiment of the invention.

Operation of the present invention is shown in the form of a state diagram in FIG. 3. The vehicle has a manual drive mode 30 in which the driver retains active control of some or all of the driving functions (e.g., steering, accelerating, and braking). If the driver wishes to utilize an autonomous driving function, then an activation command is generated using the HMI. In response to activation of the autonomous driving function, a transition is made to a set-up mode 31 wherein the driver identifies a destination and/or a driving route to be followed by the autonomous driving function. The route may be automatically calculated by a navigation system based on the destination and pre-set routing criteria as known in the art. Once the destination and route are selected, the driver can issue a command via the HMI to initiate autonomous driving along the route.

While in set-up mode 31, the autonomous driving control begins to monitor the driver's presence in the driver seat and the driver's physiological state. In order for the command to initiate driving to be accepted, not only must the driver be in the proper seated position but the physiological state must also be "normal." For the monitored biological parameter(s), a predetermined normal condition is electronically stored in the autonomous driving control for comparison with measured values. A predetermined normal condition for a heart rate may be comprised of a range of about 30 to 110 beats per minute, for example. If the driver is present and the sensed physiological state matches the range for the predetermined normal condition, then a transition is made to an active drive mode 32 wherein the various conventionally known subsystems operate to automatically control the driving of the vehicle.

While in active drive mode 32, the present invention monitors the driver as follows. The autonomous driving controller continues to monitor both for the driver's presence and for their physiological state. The sensed physiological state is continually compared to a predetermined emergency condition that corresponds to a significant likelihood that 1) the driver is unable to take over the driving function when needed, or 2) the driver is experiencing a medical emergency for which treatment should be sought. The predetermined emergency condition may be comprised of a physiological state which is an inverse of the range defined for the corresponding normal condition (e.g., a heart rate outside the range from 30 to 110), or could be defined in a manner that further limits the test for an emergency condition (e.g., a heart rate less that 25 or greater than 120). If the sensed physiological state matches the predetermined emergency condition, then a transition is made to an emergency response state 33 wherein an emergency intervention is autonomously performed.

The emergency intervention include determining an emergency route to a medical assistance facility and performing autonomous steering, acceleration, and braking functions to navigate along the emergency route. Alternatively, the emergency intervention is comprised of identifying and autonomously proceeding to an out-of-traffic stopping location and automatically transmitting a message to a public safety answering point. Once the vehicle stops at the desired re-routed destination or other safe location, the vehicle may return to the manual drive mode (not shown).

Also while in active drive mode 32, an elapsed time is monitored for any event in which the driver becomes absent from the proper position in the driver seat. As shown in FIG. 3, in the event that an elapsed time for which a driver is not present in the desired position reaches a first threshold $T_1$, then a transition is made to a warning state 34. A visual and/or audible message is generated in order to give notice to the driver that the active drive mode will be interrupted if the driver presence continues to not be detected for a further amount of time. If the elapsed time increases above a second threshold $T_2$ then the autonomous driving control terminates active drive mode 32 and initiates a safe shutdown mode 35 wherein the autonomous driving controller identifies and autonomously proceeds to an out-of-traffic stopping location (e.g., an open shoulder of a road or a parking lot).

Figure 4:
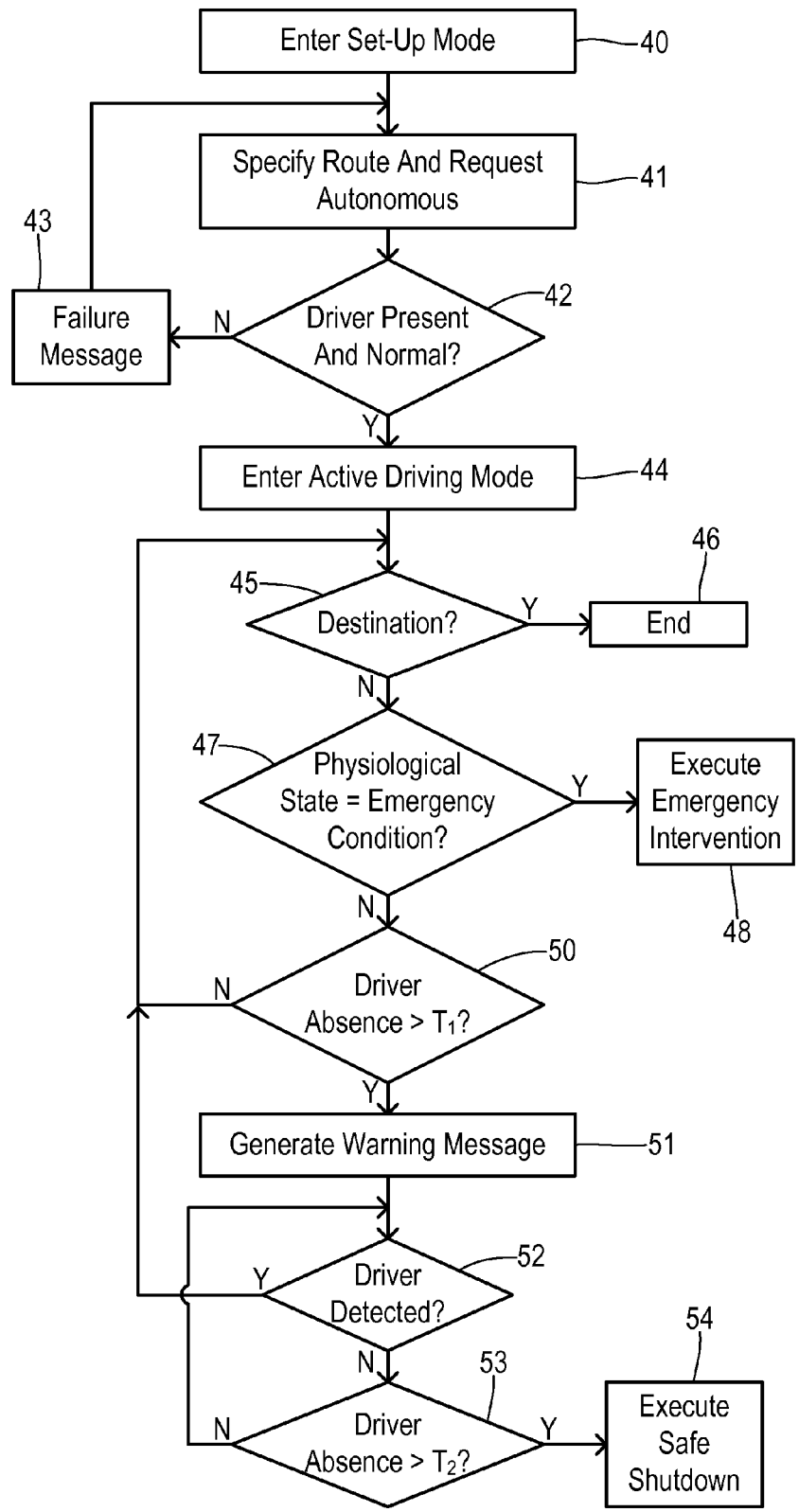
FIG. 4 is a flowchart showing one preferred method of the invention.

A preferred method of the invention is shown in FIG. 4. The set-up mode is entered in step 40. The driver specifies a route/destination in step 41 and requests that autonomous driving begin. A check is performed in step 42 to determine whether the driver is present and has a normal physiological condition. If not, then a failure message is provided to the driver in step 43 and a return is made to step 41.

If the driver is present and healthy, then the active driving mode is entered in step 44. A check is performed in step 45 to determine whether the destination has been reached. If so, then the autonomous trip ends at step 46. Otherwise, the currently monitored physiological state of the driver is compared to the predetermined emergency condition in step 47. If a match is found, then the emergency intervention executed in step 48 and the active driving mode is exited.

If the driver physiological condition is fine, then a check is performed in step 50 to determine whether the driver has been absent from the proper position for a time greater than first threshold $T_1$ (e.g., about 5 seconds or another time period that may be proportional to the speed of the vehicle). If not, then a return is made to step 45. If the elapsed time of the absence is greater than $T_1$ then a warning message is generated in step 51. The driver seat is then monitored for a return of the driver. In step 52 a check is performed to determine whether the driver presence is now detected. If so, then a return is made to step 45. Otherwise, a check is made in step 53 to determine whether the elapsed time period of the absence has risen greater than second threshold $T_2$. If so, then the safe shutdown is executed in step 54. Otherwise, a return is made to step 52 in order to continue checking for a return of the driver to the driver seat.

What is claimed is:

1. A road transportation vehicle having a driver seat, comprising:
    autonomous driving control having a set-up mode for specifying a driving route, an active drive mode for performing autonomous steering, acceleration, and braking functions to navigate along the driving route, a safe shutdown mode for identifying and autonomously proceeding to an out-of-traffic stopping location, and an emergency response mode for autonomously performing an emergency intervention; and
    a driver sensing system for sensing a driver presence in the driver seat and for sensing a physiological state of the driver;
    wherein while in the set-up mode the autonomous driving control compares the sensed physiological state to a predetermined normal condition, and the active drive mode is not entered unless the driver is present in the driver seat and the physiological state matches the predetermined normal condition;
    wherein while in the active driving mode the autonomous driving control quantifies an elapsed time period over which the driver presence is not detected, wherein if the time period increases above a first threshold then the autonomous driving control initiates a warning state to provide a notice to the driver that the active drive mode will be interrupted if the driver presence continues to not be detected, and wherein if the time period increases above a second threshold then the autonomous driving control terminates the active drive mode and initiates the safe shutdown mode; and
    wherein while in the active driving mode the autonomous driving control compares the sensed physiological state to a predetermined emergency condition and if a match is found then the autonomous driving control terminates the active drive mode and initiates the emergency response mode.

2. The vehicle of claim 1 wherein the emergency intervention is comprised of determining an emergency route to a medical assistance facility and performing autonomous steering, acceleration, and braking functions to navigate along the emergency route.

3. The vehicle of claim 1 wherein the emergency intervention is comprised of identifying and autonomously proceeding to an out-of-traffic stopping location and automatically transmitting a message to a public safety answering point.

4. The vehicle of claim 1 further comprising a driver infotainment system, wherein the notice in the warning state is comprised of an audible warning message generated by the infotainment system.

5. The vehicle of claim 1 wherein the driver sensing system is comprised of an infrared sensor for monitoring contents of the driver seat.

6. The vehicle of claim 1 wherein the driver sensing system is comprised of a capacitive sensor mounted in the driver seat.

7. The vehicle of claim 1 wherein the driver sensing system is comprised of a physiological sensor for measuring at least one of a driver's heart rate, respiration, blood pressure, and alertness.

8. The vehicle of claim 1 wherein the driver sensing system is comprised of a vision sensor mounted in the vehicle which monitors both presence and driver physiological state.

9. The vehicle of claim 1 wherein the driver sensing system is comprised of a radar sensor mounted in the vehicle which monitors both presence and driver physiological state.

10. The vehicle of claim 1 wherein the driver sensing system is comprised of a Lidar sensor mounted in the vehicle which monitors both presence and driver physiological state.

11. A method for autonomous driving of a road transportation vehicle comprising the steps of:
    specifying a driving route in a set-up mode;
    sensing a driver presence in the driver seat and sensing a physiological state of the driver;
    comparing the sensed physiological state to a predetermined normal condition and entering an active drive mode only if the driver is present in the driver seat and the physiological state matches the predetermined normal condition;
    while in the active drive mode, performing autonomous steering, acceleration, and braking functions to navigate along the driving route;
    while in the active driving mode, measuring an elapsed time period over which the driver presence is not detected and if the time period increases above a first threshold then initiating a warning state to provide a notice to the driver that the active drive mode will be interrupted if the driver presence continues to not be detected;
    while in the active driving mode, if the time period increases above a second threshold then terminating the active drive mode and initiating a safe shutdown mode comprising the steps of identifying and autonomously proceeding to an out-of-traffic stopping location;

while in the active driving mode, comparing the sensed physiological state to a predetermined emergency condition and if a match is found then terminating the active drive mode and initiating an emergency response mode for autonomously performing an emergency intervention.

12. The method of claim 11 wherein the emergency intervention is comprised of determining an emergency route to a medical assistance facility and performing autonomous steering, acceleration, and braking functions to navigate along the emergency route.

13. The method of claim 11 wherein the emergency intervention is comprised of identifying and autonomously proceeding to an out-of-traffic stopping location and automatically transmitting a message to a public safety answering point.

14. The method of claim 11 wherein the notice in the warning state is comprised of an audible warning message.

15. The method of claim 11 wherein the step of sensing a driver presence in the driver seat employs an infrared sensor for monitoring contents of the driver seat.

16. The method of claim 11 wherein the step of sensing a driver presence in the driver seat and sensing a physiological state of the driver employs a capacitive sensor mounted in the driver seat.

17. The method of claim 11 wherein the physiological state is comprised of at least one of a driver's heart rate, respiration, blood pressure, and alertness.

18. The method of claim 11 wherein the step of sensing a driver presence in the driver seat and sensing a physiological state of the driver employs a vision sensor mounted in the vehicle.

19. The method of claim 11 wherein the step of sensing a driver presence in the driver seat and sensing a physiological state of the driver employs a radar sensor mounted in the vehicle.

20. The method of claim 11 wherein the step of sensing a driver presence in the driver seat and sensing a physiological state of the driver employs a lidar sensor mounted in the vehicle.

* * * * *